(12) United States Patent
Richter

(10) Patent No.: US 7,883,329 B2
(45) Date of Patent: Feb. 8, 2011

(54) DEVICE FOR THE PRODUCTION OF TUBULAR PRE-FORMS WITH ASYMMETRICAL ANNULAR PISTONS

(76) Inventor: Günter Richter, Johannistal 12, 57610 Altenkirchen (DE)

( * ) Notice: Subject to any disclaimer, the term of this patent is extended or adjusted under 35 U.S.C. 154(b) by 871 days.

(21) Appl. No.: 10/593,938

(22) PCT Filed: Mar. 14, 2005

(86) PCT No.: PCT/EP2005/002707

§ 371 (c)(1),
(2), (4) Date: Sep. 22, 2006

(87) PCT Pub. No.: WO2005/097462

PCT Pub. Date: Oct. 20, 2005

(65) Prior Publication Data

US 2007/0202209 A1    Aug. 30, 2007

(30) Foreign Application Priority Data

Mar. 30, 2004    (DE) ............... 10 2004 015 551

(51) Int. Cl.
*B29C 47/06* (2006.01)
*B29C 47/22* (2006.01)

(52) U.S. Cl. .......... 425/133.1; 425/532; 425/381; 425/382.4; 425/462; 425/466

(58) Field of Classification Search ......... 425/133.1, 425/532, 381, 382.4, 462, 466
See application file for complete search history.

(56) References Cited

U.S. PATENT DOCUMENTS

| | | | |
|---|---|---|---|
| 4,208,178 A | 6/1980 | Przytulla | |
| 4,297,092 A * | 10/1981 | Goron | 425/133.1 |
| 4,472,129 A * | 9/1984 | Siard | 425/381 |
| 4,758,144 A * | 7/1988 | Becker | 425/133.1 |
| 4,874,305 A | 10/1989 | McGill et al. | |
| 4,937,035 A | 6/1990 | Richter et al. | |
| 5,034,179 A | 7/1991 | Richter et al. | |
| 5,262,119 A * | 11/1993 | Smith | 264/513 |

FOREIGN PATENT DOCUMENTS

| | | |
|---|---|---|
| DE | 27 12 910 | 9/1978 |
| DE | 91 07 812 | 10/1991 |
| EP | 0 530 582 | 3/1993 |
| GB | 1 591 317 | 6/1981 |

* cited by examiner

*Primary Examiner*—Yogendra N Gupta
*Assistant Examiner*—Joseph Leyson
(74) *Attorney, Agent, or Firm*—Lucas & Mercanti, LLP; Klaus P. Stoffel

(57) ABSTRACT

The invention relates to a device for the production of multilayer, co-extruded, tubular pre-forms made from thermoplastic plastic. A co-extrusion head (10) comprises co-axially arranged flow channels (FK1, FK2), each supplied by a single inlet opening (ZF1, ZF2) with a material melt, distributed annularly in a distribution ring (26, 28). The gap width in each distribution ring (26, 28) is greater in the vicinity of the inlet opening (ZF1, ZF2) than the gap width (s2, s6) in the region of the side opposing the inlet opening (ZF1, ZF2). The flow channels (FK1, FK2) are also asymmetric with regard to the gap widths.

13 Claims, 7 Drawing Sheets s1 > s3 s9 > s3

F26 > FFK1

F22 > FFK1

DEVICE FOR THE PRODUCTION OF TUBULAR PRE-FORMS WITH ASYMMETRICAL ANNULAR PISTONS

BACKGROUND OF THE INVENTION

1. Field of the Invention

The invention concerns devices for producing multilayer, coextruded, tubular preforms made of thermoplastic material. A device of this type has a coextrusion head with several, essentially coaxially arranged, flow channels, each of which is fed from an individual inlet opening with a material melt, which is annularly distributed and flows along an annular conical frustum, wherein the flow channels become a common annular flow channel that widens like a funnel. A displaceable annular piston can reciprocate in an annular accumulation chamber, which is followed by an annular discharge channel with an annular extrusion orifice that can be closed.

2. Description of the Related Art

EP 0 326 584 B1 of the same applicant discloses a method and a device for producing large-volume hollow plastic bodies with multilayer walls. The gap widths in each flow channel are constant along the circumference of the ring. Due to the one-sided supply of the material melt, different pressure conditions thus develop along the ring and along the annular conical frustum, which impair uniform flow of the material melt, so that material mixing occurs, which leads to loss of quality of the preform.

In addition, DE 195 45 441 A1 of the same applicant discloses a device for producing dish-shaped molded parts made of a thermoplastic material. This device also uses a coextrusion head, in which the material melt flows in several layers, from which a multilayer tubular preform is produced.

SUMMARY OF THE INVENTION

The present invention builds on the prior art disclosed in the two documents cited above. The content of these documents is herewith incorporated in the disclosed content of the present application.

The objective of the invention is to specify a device of the aforementioned type, in which uniform flow of the multilayer material melt in the coextrusion head is realized.

A further objective of the invention is to specify a device with a simple feed device for supplying the material melt.

Yet another objective of the invention is to specify a device, in which the annular accumulation chamber is filled with material melt gently and with a high degree of uniformity.

These objectives are achieved by the objects specified in the claims. Advantageous refinements are specified in the dependent claims.

BRIEF DESCRIPTION OF THE DRAWING

The invention is explained below with reference to specific embodiments.

DETAILED DESCRIPTION OF THE INVENTION

Figure 1:
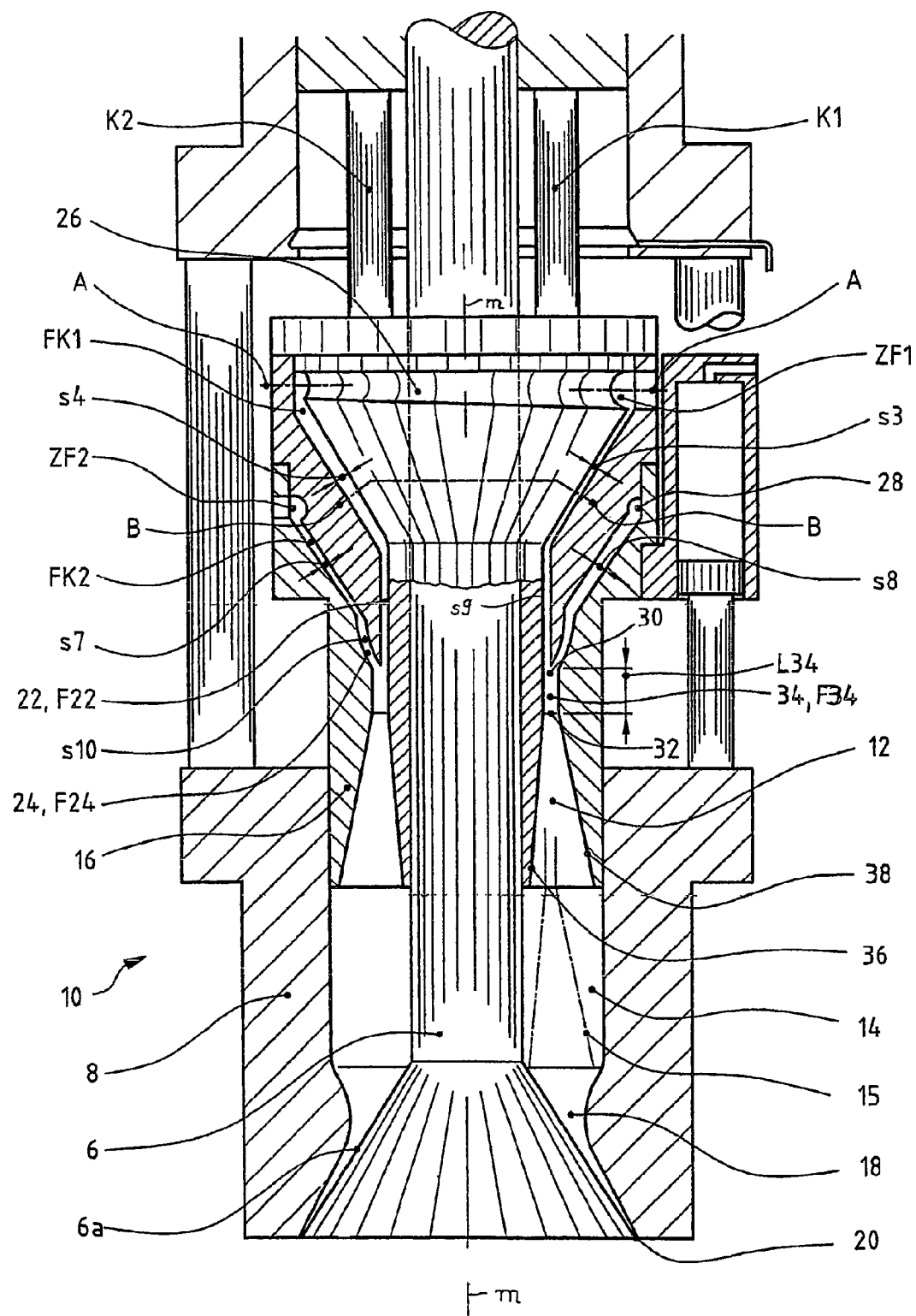
FIG. 1 shows a longitudinal section through a coextrusion head.

FIG. 1 shows a partial longitudinal section of a coextrusion head 10, which comprises an accumulator jacket 8, which surrounds an annular accumulation chamber 14, which holds the material melt to be discharged. The accumulator jacket 8 is connected with a housing (not shown). A first material melt is fed through an inlet opening ZF1 to a first distributor ring 26, which is part of an annular piston 16. The annular piston 16 can be moved along its longitudinal axis and slides along a torpedo 6 and the accumulator jacket 8. The annular piston 16 is connected by piston rods K1, K2 with a hydraulic system (not shown). The torpedo 6 is likewise connected at its upper end with a hydraulic system (not shown).

The first material melt is conveyed horizontally along the first distributor ring 26 and at the same time flows downward along an annular flow channel FK1, which is designed as an annular conical frustum. The downward flowing first material melt then enters a first cylindrical ring 22 and from there reaches a orifice_30, into which a second material melt opens. This second material melt is supplied through a second inlet opening ZF2, which is arranged diametrically to inlet opening ZF1. The second material melt is likewise distributed from the second inlet opening ZF2 by an associated peripheral second distributor ring 28 and enters the second flow channel FK2, which is designed as an annular conical frustum. The second material melt flows from there into a second cylindrical ring 24, from which it reaches the orifice 30.

The two material melts should flow in such a way that the interface between the two material melts runs as smoothly as possible and is not disturbed by turbulence. The orifice 30 is followed by a region of quieted flow, which is formed as a common cylindrical ring 34. This region of quieted flow ensures that after the material melts come together at the orifice 30, uniform flow of the material melts is obtained, so that smooth running of the interface between the two material melts is produced. The two material melts then flow to a point of widening 32, where they enter a widening, common flow channel 12. This flow channel 12 has a funnel-shaped cross section and is annularly formed in the annular piston 16.

At the beginning of the filling operation, the annular piston 16 is in its lower position, as is schematically indicated by broken lines in connection with reference number 15. The funnel-shaped common channel 12 is still filled with the two material melts from the previous production operation for producing a tubular preform. The resumption of flow of the two material melts causes the annular piston 16 to move upward. Due to the funnel shape of the common flow channel 12 and the other geometry of the material melt supply system, the interface that forms between the two material melts remains largely smooth and is not swirled into a turbulent state.

When the annular piston 16 has reached its upper operating point, the torpedo 6 is moved downward, and its nozzle pintle 6a opens an annular extrusion orifice 20, so that during a downward movement of the annular piston 16, the tubular preform with the interface between the two material melts is discharged. To maintain smooth running of the interface, an annular discharge channel 18 is provided with a special geometry. When the discharge operation has been completed, the torpedo 6 is moved back up and closes the extrusion orifice 20, whereupon a new filling operation for the annular accumulation chamber 14 begins.

Figure 2:
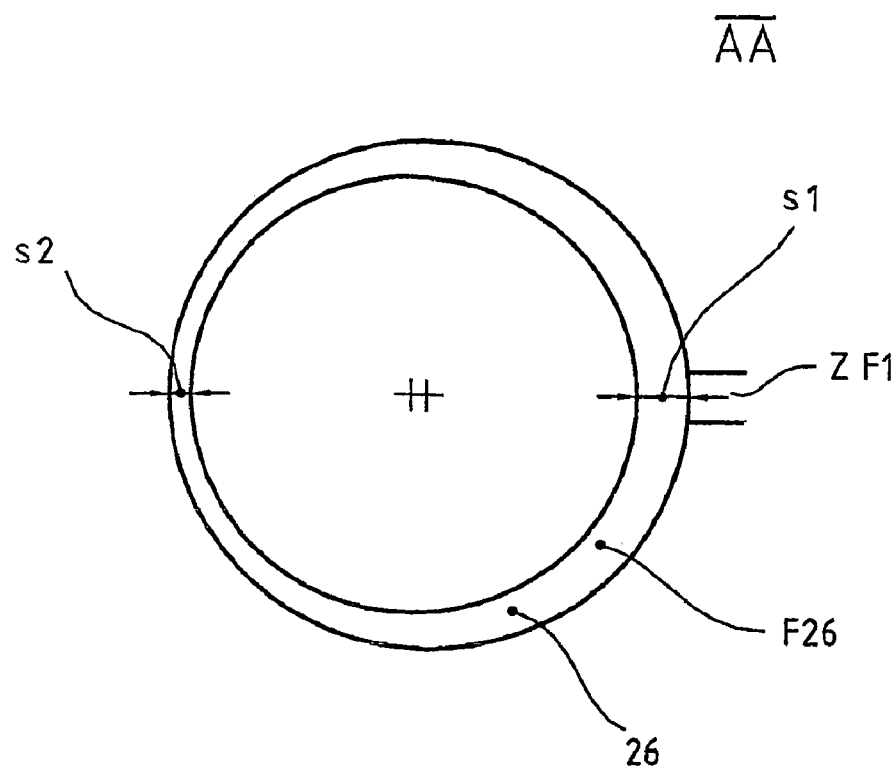
FIG. 2 shows a cross section through the first distributor ring.
Figure 3:
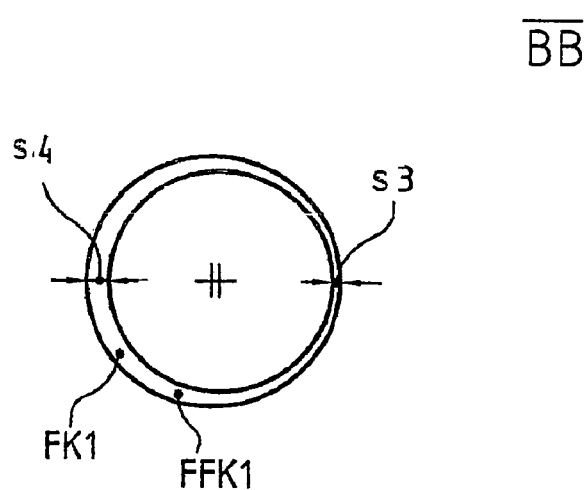
FIG. 3 shows a cross section through the first flow channel.

The geometric features of the design of the annular piston 16 that are responsible for the uniform flow of the material melt that is supplied are explained below. As FIG. 1 shows, the first distributor ring 26 is not formed symmetrically with respect to the center axis m, but rather it has a greater cross-sectional area in the vicinity of the first inlet opening ZF1 than it does on the opposite side from the inlet opening ZF1. This is illustrated in FIG. 2 by a cross section along line A-A. The gap width s1 of the first distributor ring 26 is greater in the vicinity of the first inlet opening ZF1 than the gap width s2 on the opposite side. The material melt flows from this distributor ring 26 into the annular flow channel FK1. FIG. 3 shows a cross section through this flow channel along line B-B. The effective gap width s3, i.e., the gap width in the direction of the normal, approximately in the center of the annular conical frustum, is smaller on the side of the first inlet opening ZF1 than the gap width s4 on the opposite side. The annular cross-sectional area F26 in the center of the first distributor ring 26 along the sectional line AA is greater than the mean effective cross-sectional area FFK1 of the first flow channel FK1 along the sectional line BB. Accordingly, the material melt flow is throttled, and there is an increase in pressure.

Figure 4:
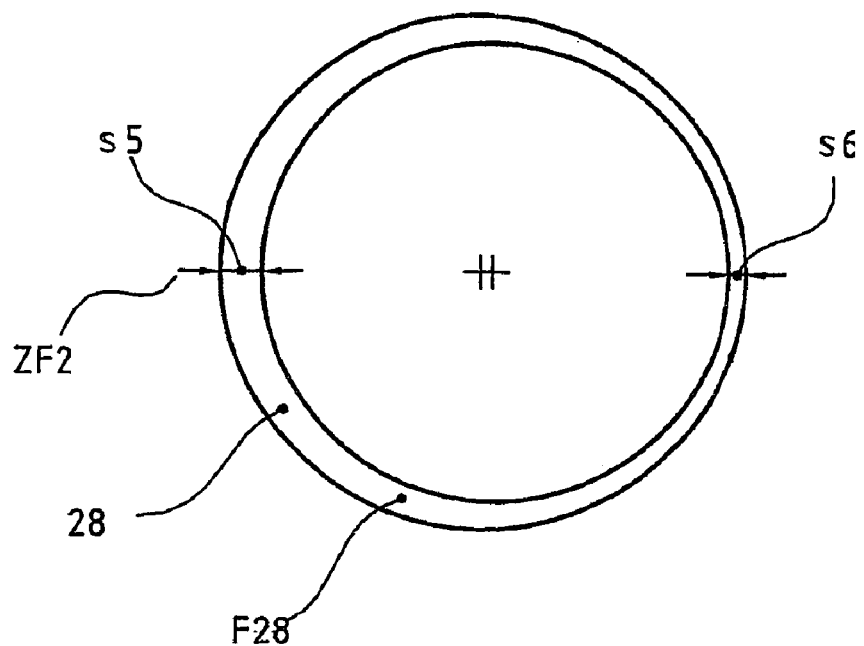
FIG. 4 shows a cross section through the second distributor ring.
Figure 5:
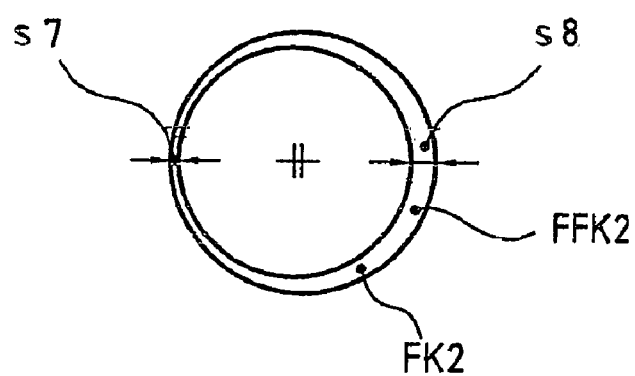
FIG. 5 shows a cross section through the second flow channel.

FIGS. 4 and 5 show the conditions with respect to the second material melt. The gap width s5 of the second distributor ring 28 is greater on the side of the second inlet opening ZF2 than the gap width s6 on the opposite side. In the second flow channel FK2, the gap width s7 on the side of the second inlet opening ZF2 is smaller than the gap width s8 on the opposite side. Here again, there is an increase in pressure when the material melt flows from the inlet opening ZF2 into the second flow channel FK2, since the annular cross-sectional area F28 is greater than the cross-sectional area FFK2 of the second flow channel FK2.

After passing through the first flow channel FK1, the first material melt enters the first cylindrical ring 22 (see FIG. 1). This cylindrical ring 22 has a constant gap width s9 along its length and circumference. This gap width s9 is configured in such a way that the cross-sectional area F22 of the cylindrical ring 22 is greater than the cross-sectional area FFK1 at the end of the first flow channel FK1, which makes a transition into the cylindrical ring 22. F22 is preferably twice as large as FFK1. Similar conditions apply to the second material melt, which flows from the second flow channel FK2 into the cylindrical ring 24. This cylindrical ring 24 has a constant gap width s10, which is configured in such a way that the cross-sectional area F24 is greater than the cross-sectional area FFK2 at the end of the second flow channel FK2. The specified geometric configuration and the resulting asymmetrical guidance and throttling of the flow of the material melt provide uniform flow from the distributor rings 26 and 28 via the flow channels FK1 and FK2, which are shaped like conical frustums, to the cylindrical rings 22 and 24.

Figure 6:
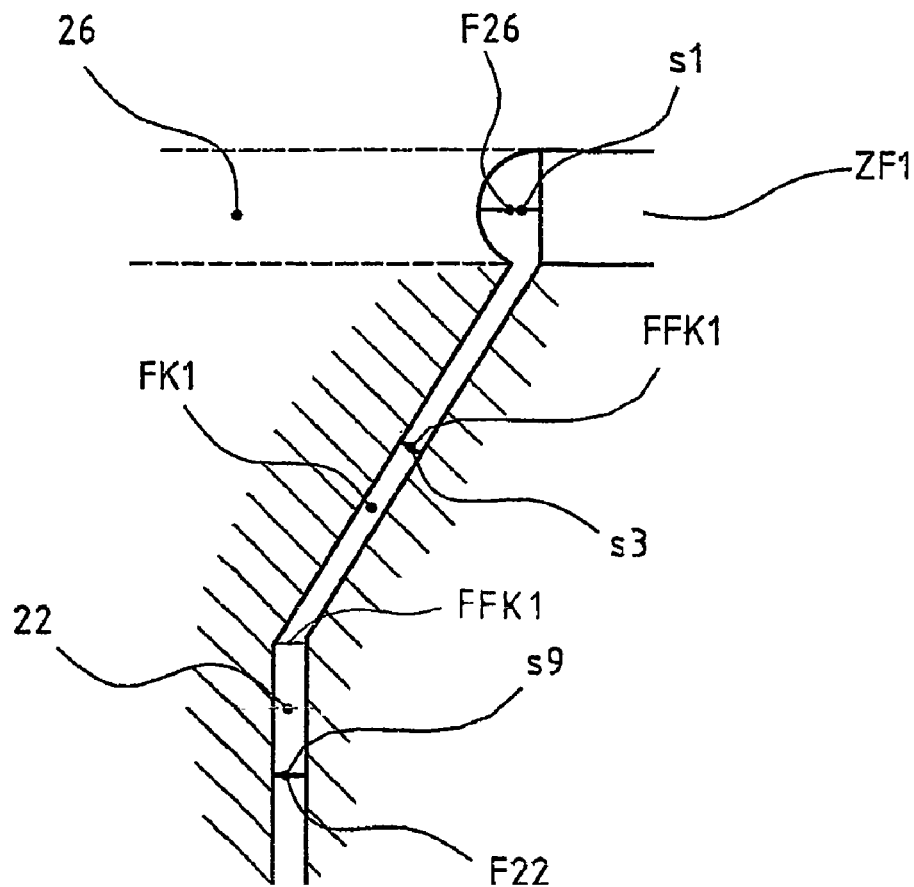
FIG. 6 shows a cutaway section to show the gap widths.

FIG. 6 shows the geometric relationships on the basis of a cutaway section with distributor ring 26, flow channel FK1, and cylindrical ring 22, and the associated size relationships for the gap widths s1, s3, and s9 and the annular cross-sectional areas F26, FFK1, and F22. The first material melt flowing in at ZF1 is uniformly distributed in the horizontal direction along the distributor ring 26 and does not flow off immediately in the vertical direction into the first flow channel FK1, since the latter has a reduced gap width s3<s4 in the vicinity of the inlet opening ZF1, and F26>FFK1. Since s4>s3, the flow rate at s3 is greater than at s4 at otherwise equal material volume/time. In the cylindrical ring 22 with s9>s3, the material is quieted, and the material flow rate is equalized in the circumferential direction of the cylindrical ring 22, with the result that the first material melt has the same flow rate along the circumference at the orifice 30.

The dimensions of the gap widths s1 to s10 are to be selected as a function of the material for the first material melt and the second material melt. Typically, the cross-sectional areas F22 and F24 of the cylindrical rings 22 and 24 can be selected to be at most half as great as the cross-sectional areas F26 and F28 of the corresponding distributor rings 26 and 28.

The two material melts meet at the orifice 30 and pass together through the common cylindrical ring 34, which likewise constitutes a region of quieted flow in which turbulence of the interface between the two material melts is avoided. The cross-sectional area F34 of this common cylindrical ring 34 is equal to the sum of the cross-sectional areas F22 and F24 of the cylindrical rings 22 and 24 (F34=F22+F24). The length L34 of the common cylindrical ring 34 is preferably greater than or equal to twice the sum of the gap widths of cylindrical ring 22 and cylindrical ring 24 (L34≧2(s9+s10)).

After passing through the region of quieted flow and the point of widening 32, the united material melts enter the common flow channel 12, which widens like a funnel. This flow channel 12 is bounded by an inner conical frustum surface 36 and an outer conical frustum surface 38. When viewed in longitudinal section, these conical frustum surfaces 36, 38 form an asymmetrical funnel, with a first angle between the vertical and the inner conical frustum surface 36 being smaller than a second angle between the vertical and the outer conical frustum surface 38. The first angle can typically be on the order of 0°, i.e., the inner conical frustum surface 36 can be configured as a cylindrical surface.

Figure 7:
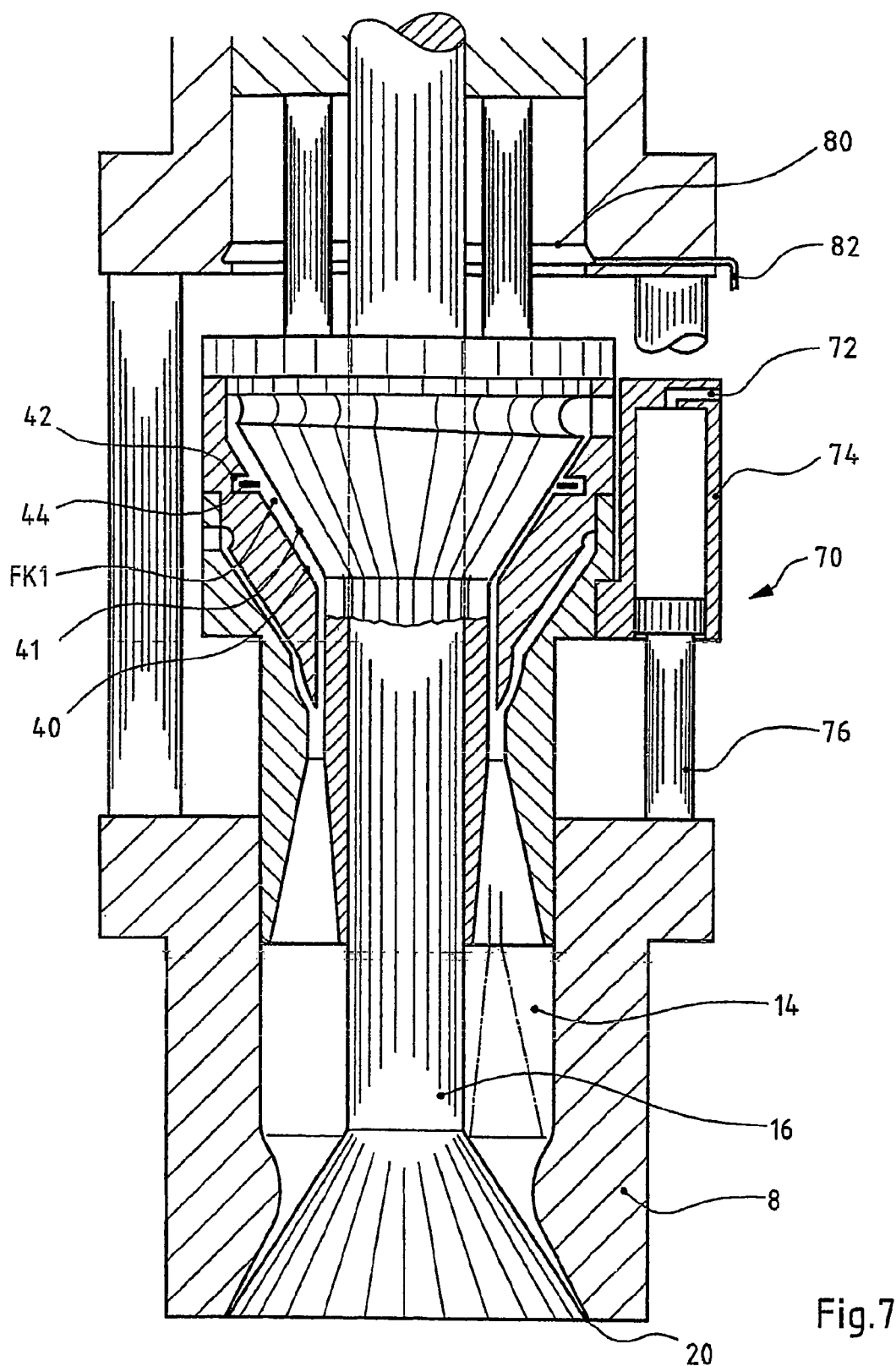
FIG. 7 shows a longitudinal section through the coextrusion head with baffle and load-relieving cylinder.

FIG. 7 shows an example in which the material flow within the first flow channel FK1 is controlled by throttling with a baffle. The flow channel FK1 is configured as an annular conical frustum and is bounded by an outer wall 40 and an inner wall 41. An annular groove 42 that holds the baffle 44 is set in the outer wall 40. This baffle 44 can be moved into the corresponding annular conical frustum for throttling the flow of the material melt in the flow channel FK1. Preferably, an elastic baffle 44 is used, whose inside diameter can be varied by means of an adjusting device. Reduction of this inside diameter then produces throttling of the material flow. FIG. 7 shows only a baffle 44 for the first flow channel FK1. It is also possible to install a throttling device of this type in only one of the two flow channels FK1 or FK2, or in both of these flow channels and in other flow channels.

Figure 8:
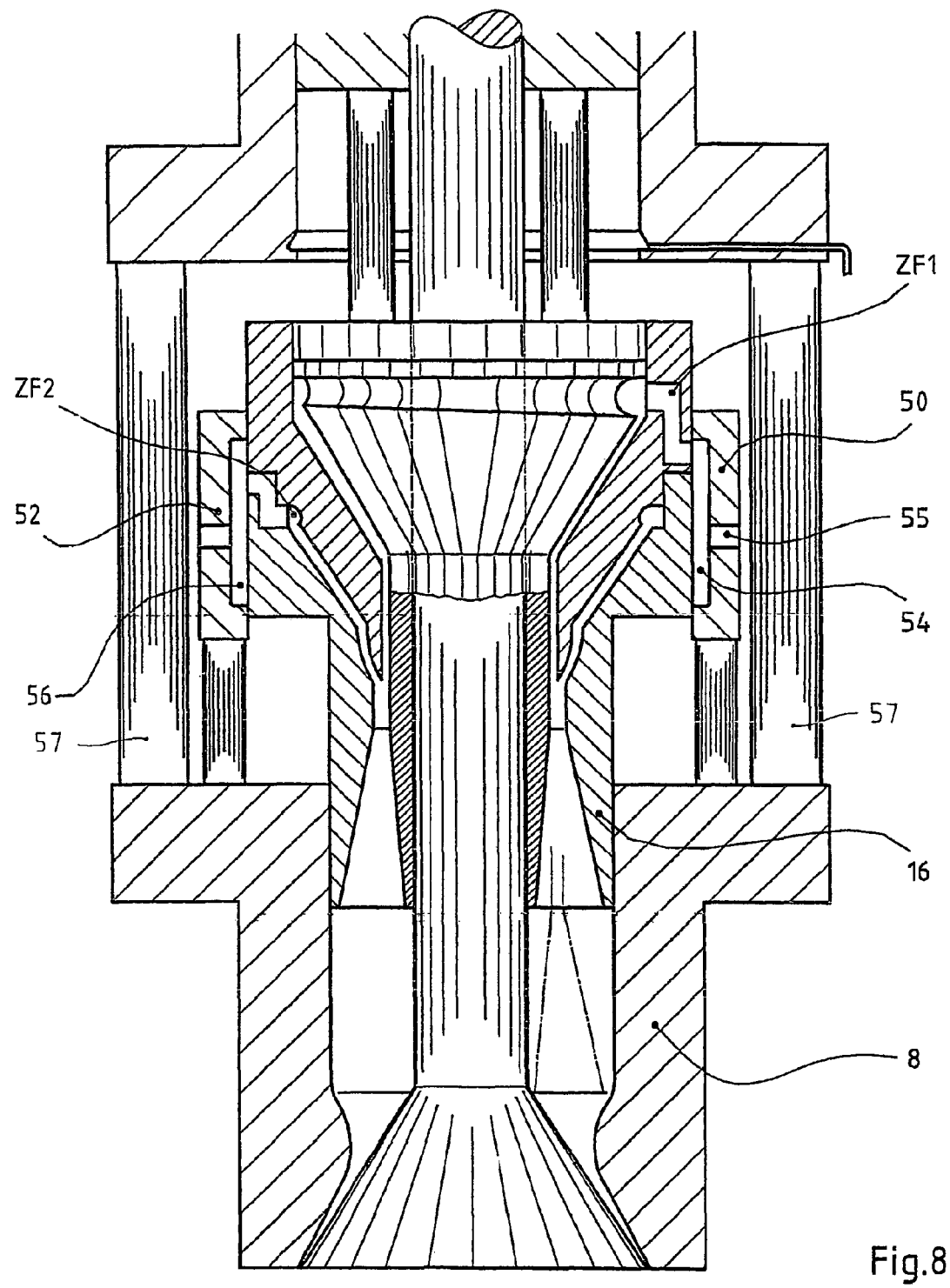
FIG. 8 shows a longitudinal section through the coextrusion head with a first feeding device.
Figure 9:
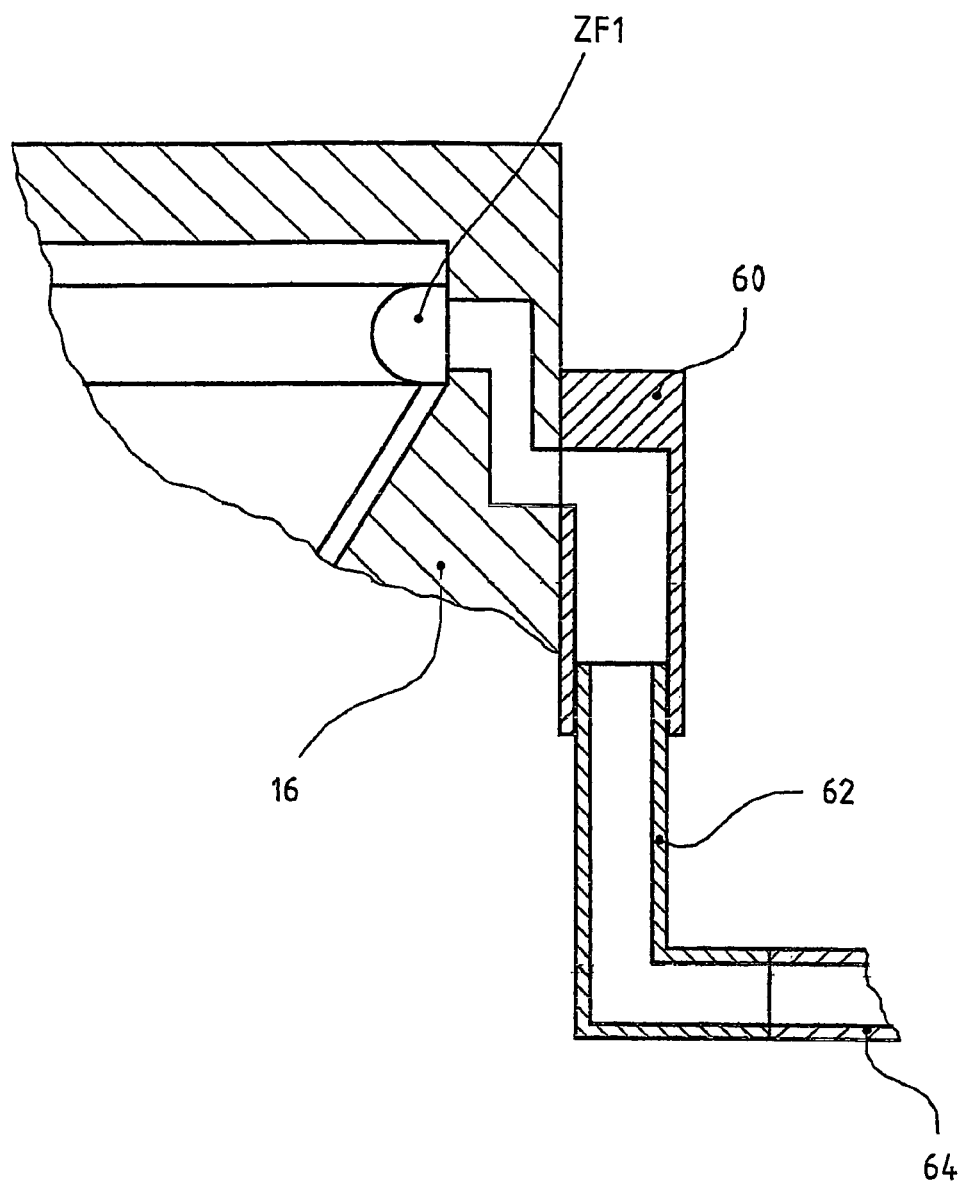
FIG. 9 shows a longitudinal section through a second feeding device.

FIGS. 8 and 9 show embodiments in which a special feeding device is used to supply the material melt. In FIG. 8, the first inlet opening ZF1 is connected with a feeding device 50, which in turn is rigidly connected with the housing of the coextrusion head 10, for example, seated in a stationary manner on the accumulator jacket 8, supported by a column 57. As was mentioned earlier, the annular piston 16 can move up and down. The feeding device 50 contains a recess 54, which further conveys the material melt to the inlet opening ZF1 during the stroke of the annular piston 16. The recess 54 receives the material melt via an inlet channel 55, which is rigidly connected with an extruder line (not shown). A similar feeding device 52 with a recess 56 is also provided for the second material melt, which is supplied to the second inlet opening ZF2. The recesses 54, 56 have a vertical length equal to the stroke of the annular piston 16. The feeding device 50, 52 is preferably designed as an annular segment and extends along the circumference of the annular piston 16. In this example, the extruder line does not have to perform any rotating movements during the stroke of the annular piston 16, so that it is possible to save moving parts. The columns 57 hold the feeding devices 50, 52 and leave sufficient free space around the feeding device 50, 52, so that adequate material, which then becomes encrusted, can be easily removed from the region of the recesses 54, 56.

FIG. 9 shows an alternative solution for the feeding. The inlet opening ZF1 is rigidly connected with a feed cylinder 60. The feed cylinder 60 thus carries out the lifting movement of the annular piston 16. A hollow feed piston 62 moves in the feed cylinder 60. The hollow feed piston 62 is connected in a stationary manner, for example, rigidly, with the jacket ring 8. The feed piston 62 is also rigidly connected with an extruder line 64, which supplies the material melt. In this arrangement as well, the extruder line 64 does not have to carry out any tilting or rotating movement corresponding to the movement of the inlet opening ZF1. A similar feeding device can also be provided for the second inlet opening ZF2.

FIG. 7 shows another example, in which the annular piston 16 is rigidly connected with a hydraulic system 70, which is acted upon with hydraulic fluid through a hydraulic line 72. The hydraulic system 70 serves the purpose of load relief and works in such a way that it takes some of the weight of the annular piston 16, which weighs on the melt in the annular accumulation chamber 14 as the latter is being filled. The annular piston 16 can weigh several tons, and the material properties of the material melt can change under this pressure. The hydraulic system 70 thus removes some of the weight during the filling of the annular accumulation chamber 14. When the material melt is discharged from the annular accumulation chamber 14 through the annular extrusion orifice 20, the hydraulic system is switched to an inoperative status, so that the weight of the annular piston 16 assists with the discharge. It is advantageous for the hydraulic system 70 to have a cylinder 74 with a piston 76, with the cylinder 74 being rigidly connected with the annular piston 16. The piston 76 is supported on the housing or the annular jacket 8, which results in a compact configuration. It is advantageous for two units consisting of a cylinder and piston to be installed on diametrically opposite sides of the annular piston 16.

In accordance with an additional measure, a collecting device 80 is installed above the annular piston 16 for collecting hydraulic oil dripping from the hydraulic systems for the annular piston 16 and the torpedo 6. This hydraulic oil would drip from the top end of the annular piston 16, which is hot during operation, and cause fouling and other problems. The hydraulic oil is carried away from the vicinity of the annular piston 16 by a drain line 82 and removed.

The examples shown here concern a coextrusion head for processing two material melts. If more than two material melts are to be processed, correspondingly greater numbers of inlet openings, distributor rings, flow channels, etc., must be provided in similar fashion. In practice, it is possible to process five or even six different material melts, which results in a complex design of the annular piston 16 and other associated structural parts.

LIST OF REFERENCE NUMBERS 6 torpedo
8 accumulator jacket
10 coextrusion head
12 common flow channel
14 annular accumulation chamber
ZF1 first inlet opening
ZF2 second inlet opening
16 annular piston
K1, K2 piston rods
15 lower position of the annular piston
18 annular discharge channel
20 extrusion orifice
22 first cylindrical ring
24 second cylindrical ring
26 first distributor ring
28 second distributor ring
30 orifice
32 point of widening
34 common cylindrical ring
s1 to s10 gap widths
F26 cross-sectional area of the first distributor ring
F28 cross-sectional area of the second distributor ring
FK1 first flow channel
FK2 second flow channel
FFK1 cross-sectional area of the first flow channel
FFK2 cross-sectional area of the second flow channel
F22 cross sectional area of the first cylindrical ring
F24 cross-sectional area of the second cylindrical ring
F34 cross-sectional area of the common cylindrical ring
L34 length
36 inner conical frustum surface
38 outer conical frustum surface
40 outer wall
41 inner wall
42 groove
44 baffle
50, 52 feeding device
54, 56 recess
55 inlet channel
57 columns
60 feed cylinder
62 feed piston
64 extruder line
70 hydraulic system
72 hydraulic line
74 cylinder
76 piston
80 collecting device
82 drain line

The invention claimed is:

1. Device for producing multilayer, coextruded, tubular preforms made of thermoplastic material, with a coextrusion head (10) with several essentially coaxially arranged flow channels (FK1, FK2), each of which is fed from an individual inlet opening (ZF1, ZF2) with a material melt, which is annularly distributed in a distributor ring (26, 28) and flows along an annular conical frustum, wherein the material melts flow into a common annular flow channel (12) that widens like a funnel, with an annular accumulation chamber (14), in which a displaceable annular piston (16) can reciprocate, and with an annular discharge channel (18) that follows the annular accumulation chamber (14) and has an annular extrusion orifice (20) that can be closed, wherein, as viewed in a longitudinal section through the coextrusion head, the gap width (s1, s5) in the respective distributor ring (26, 28) is greater in the vicinity of the inlet opening (ZF1, ZF2) than the gap width (s2, s6) on the opposite side from the inlet opening (ZF1, ZF2), and that, as viewed in a longitudinal section through the coextrusion head, the gap width (s3, s7) in the respective flow channel (FK1, FK2) is smaller in the vicinity of the inlet opening (ZF1, ZF2) than the gap width (s4, s8) on the opposite side from the inlet opening (ZF1, ZF2), wherein each flow channel (FK1, FK2) opens into a first cylindrical ring (22, 24), wherein a region of quieted flow, which is formed as a common cylindrical ring (34), is provided between a mouth (30), at which several material melts come together, and a point of widening (32), at which the combined material melts enter the common flow channel (12), which widens like a funnel, and wherein the cross-sectional area (F34) of the common cylindrical ring (34) is equal to the sum of the cross-sectional areas (F22, F24) of the first cylindrical rings (22, 24).

2. Device in accordance with claim 1, wherein the cross-sectional area (F26, F28) of the respective distributor ring (26, 28) is greater than the cross-sectional area (FFK1, FFK2) of the corresponding flow channel (FK1, FK2).

3. Device in accordance with claim 1, wherein the cross-sectional area (F22, F24) of the respective cylindrical ring (22, 24) is greater, than the cross-sectional area (FFK1, FFK2) at the end of the corresponding flow channel (FK1, FK2).

4. Device in accordance with claim 3, wherein the cross-sectional area (F22, F24) of the respective cylindrical ring (22, 24) is at most twice as great as the mean cross-sectional area (F26, F28) of the corresponding distributor ring (26, 28).

5. Device in accordance with claim 1, wherein the length of the common cylindrical ring (34) is greater than or equal to twice the sum of the annular gaps (s9, s10) of the corresponding first cylindrical rings (22, 24).

6. Device in accordance with claim 1, wherein the funnel-shaped, annular common flow channel (12) is bounded by an inner conical frustum surface (36) and an outer conical frustum surface (38), such that, when viewed in a longitudinal section through the coextrusion head (10), a first angle between the vertical and the inner conical frustum surface (36) is smaller than a second angle between the vertical and the outer conical frustum surface (38).

7. Device in accordance with claim 1, wherein an annular groove (42) is provided in an outer wall (40) in the vicinity of each flow channel (FK1, FK2), which is configured as an annular conical frustum, and the annular groove holds a baffle (44), which can be moved into the annular conical frustum to throttle the flow of the material melt.

8. Device in accordance with claim 7, wherein the inside diameter of the baffle (44) can be varied by means of an adjusting device.

9. Device in accordance with claim 7, wherein each inlet opening (ZF1, ZF2) is connected with a feeding device (50, 52), which is rigidly connected with the coextrusion head (10) and has a feed recess (54, 56), which further conveys the material melt to the inlet opening (ZF1, ZF2) during the stroke of the annular piston (16), and wherein the material melt is supplied to the feeding device (50, 52) through a rigidly connected extruder line.

10. Device in accordance with claim 9, wherein the feed recess (54, 56) has a length equal to the stroke of the annular piston (16).

11. Device in accordance with claim 10, wherein the feeding device (50, 52) is designed as an annular segment.

12. Device in accordance with claim 9, wherein two feeding devices (50, 52) arranged diametrically to each other are provided for two different material melts.

13. Device in accordance with claim 1, wherein each inlet opening (ZF1, ZF2) is connected with a feed cylinder (60), which is rigidly mounted on the displaceable annular piston (16) and holds a movable hollow feed piston (62), which is mounted in a stationary way and to which the material melt is supplied by an extruder line (64) that is rigidly connected with it.

* * * * *